(12) United States Patent
Boese

(10) Patent No.: US 8,967,107 B2
(45) Date of Patent: Mar. 3, 2015

(54) CAMSHAFT ADJUSTER FOR AN INTERNAL COMBUSTION ENGINE

(75) Inventor: Olaf Boese, Nurernberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/884,453

(22) PCT Filed: Sep. 2, 2011

(86) PCT No.: PCT/EP2011/065161
§ 371 (c)(1),
(2), (4) Date: May 30, 2013

(87) PCT Pub. No.: WO2012/062495
PCT Pub. Date: May 18, 2012

(65) Prior Publication Data
US 2013/0327288 A1    Dec. 12, 2013

(30) Foreign Application Priority Data
Nov. 11, 2010 (DE) .......................... 10 2010 051 052

(51) Int. Cl.
*F01L 1/34* (2006.01)
*F01L 1/344* (2006.01)
*F16F 1/10* (2006.01)

(52) U.S. Cl.
CPC ............... *F01L 1/344* (2013.01); *F01L 1/3442* (2013.01); *F16F 1/10* (2013.01); *F01L 2001/34483* (2013.01)

USPC ...................... 123/90.17; 123/90.15; 464/160

(58) Field of Classification Search
USPC ............................ 123/90.15, 90.17; 464/160
See application file for complete search history.

(56) References Cited

U.S. PATENT DOCUMENTS

| 5,149,027 A | 9/1992 | Weber |
| 7,987,829 B2 | 8/2011 | Dupuis et al. |
| 8,166,936 B2 * | 5/2012 | Fujiyoshi .................. 123/90.17 |
| 8,230,832 B2 | 7/2012 | Isenberg et al. |
| 2005/0252468 A1 | 11/2005 | Tanaka |
| 2010/0199937 A1 | 8/2010 | Fujiyoshi |

FOREIGN PATENT DOCUMENTS

| DE | 102009005114 A1 | 8/2009 |
| DE | 102008051732 A1 | 4/2010 |
| EP | 2166199 A1 | 3/2010 |
| JP | 2000161027 A | 6/2000 |
| JP | 2003120229 A | 4/2003 |

* cited by examiner

*Primary Examiner* — Ching Chang
(74) *Attorney, Agent, or Firm* — Davidson, Davidson & Kappel, LLC

(57) ABSTRACT

A camshaft adjuster (1, 51) for an internal combustion engine, including a stator (5) which is connectable in a rotationally fixed manner to a crankshaft, a rotor which is mounted in the stator (5) so as to be rotatable about a rotational axis, a sealing cover (7, 53) for minimizing leakage, and a spring element (9, 59) for positioning the rotor with respect to the stator (5). The spring element (9, 59) is held on the sealing cover (7, 53) in the axial direction via a spring clip (3, 41). The use of a spring clip (3, 41) provides a cost-neutral and reduced-weight option for reliably positioning the rotor with respect to the stator (5).

12 Claims, 4 Drawing Sheets

CAMSHAFT ADJUSTER FOR AN INTERNAL COMBUSTION ENGINE

The present invention relates to a camshaft adjuster for an internal combustion engine, including a stator which is connectable in a rotationally fixed manner to a crankshaft, a rotor which is mounted in the stator so as to be rotatable about a rotational axis, a sealing cover for minimizing leakage, and a spring element for positioning the rotor with respect to the stator.

BACKGROUND

A camshaft adjuster is used for the targeted adjustment of the phase position between a camshaft and a crankshaft in an internal combustion engine, and thus allows the optimized setting of the valve timing via the engine load and the engine speed. A distinct reduction in the fuel consumption and the exhaust gas emissions as well as increased power of the engine may be achieved in this way.

A camshaft adjuster is usually composed of a stator, a rotor which is positioned in the stator, and two sealing covers. For locking the rotor, one of the sealing covers is often designed as a locking cover having an appropriate locking slide.

In the installed state, the stator is connected in a rotationally fixed manner to a crankshaft, whereas the rotor is connected in a rotationally fixed manner to a camshaft. The stator is designed with a number of pressure chambers which are formed by webs extending radially inwardly away from the stator wall. The rotor mounted inside the stator is positioned with its rotor blades in the stator. The torsion angle of the rotor is delimited by the webs in the stator.

For camshaft adjustment, the pressure chambers may be acted on by a hydraulic medium and thus turn the rotor inside the stator. Due to the torsion of the rotor with respect to the stator, the phase position of the camshaft may be changed, and the opening times of the valves in an internal combustion engine may thus be controlled.

Spring elements are often used to move a rotor back into a neutral or starting position during operation of a camshaft adjuster. These types of spring elements are typically designed in such a way that that they allow the rotor to rotate relative to the stator, so that the rotor may be moved into the desired position inside the stator. A secure fastening of the spring element is necessary to ensure such rotation.

In this regard, a camshaft adjuster of the type mentioned at the outset, having a spring element designed as a torsion spring, is known from DE 10 2009 005 114 A1. The torsion spring is fastened via its two spring ends to spring retainers provided for this purpose, and is situated between a so-called spring cover plate and the sealing cover which is designed as a front cover plate. The spring cover plate is connected to the sealing cover via bolts.

In addition, a device for the variable setting of the timing of gas exchange valves of an internal combustion engine, having a spring element designed as a torsion spring, is known from DE 10 2008 051 732 A1. The torsion spring is situated in a spring chamber, and is fastened via its two spring ends to a sealing cover which is designed as a side cover. The spring chamber is delimited by a pot-shaped snap-on cover, for which purpose the snap-on cover at least partially overlaps the device radially and axially. According to DE 10 2008 051 732 A1, the snap-on cover and the sealing cover are fastened to one another via form-locked elements.

Both of the above-mentioned embodiments allow secure holding of the torsion spring on the sealing cover. However, use of spring cover plates and snap-on covers does not represent a permanent solution for positioning a spring element on a sealing cover due to their weight and the costs associated with manufacture.

SUMMARY OF THE INVENTION

It is an object of the present invention to provide a camshaft adjuster which, compared to the related art, provides at least a cost-neutral and reduced-weight option for reliably positioning the rotor with respect to the stator.

The present invention provides a camshaft adjuster for an internal combustion engine, including a stator which is connectable in a rotationally fixed manner to a crankshaft, a rotor which is mounted in the stator so as to be rotatable about a rotational axis, a sealing cover for minimizing leakage, and a spring element for positioning the rotor with respect to the stator. The spring element is held on the sealing cover in the axial direction via a spring clip.

The present invention takes into account the fact that the secure positioning of a spring element is absolutely necessary for ensuring the function of a camshaft adjuster. The required axial installation space delimitation may be achieved by the use of common snap-on covers. However, since snap-on covers are usually manufactured as solid components, the continuously increasing demands regarding the weight and manufacturing costs of camshaft adjusters, in particular with regard to minimizing costs during their production and installation, are met only to a limited extent.

The present invention recognizes that the above-mentioned problem may be overcome when, instead of using a snap-on cover or a spring cover plate, a spring clip is used which holds the spring element on the sealing cover in the axial direction. By securing the spring element in this way, an axial installation space delimitation may be achieved which holds the spring element on the sealing cover in the axial direction. The spring clip prevents the spring element from swinging upward axially, and prevents the sealing cover from possibly coming off when there is excessive axial movement during operation of a camshaft adjuster.

Due to the use of a spring clip, a solid snap-on cover which is complicated to manufacture may be dispensed with. In addition, due to the much smaller size of a spring clip compared to the common snap-on covers, the mass inertia of the camshaft adjuster, and therefore the drive forces necessary to activate it, may be reduced.

In other words, the use of a spring clip provides a cost-neutral and reduced-weight option for reliably holding a spring element in the intended position on a sealing cover.

The spring clip used is preferably designed with a base body and a number of legs situated on same. The spring clip is preferably manufactured in one piece. In addition, the size of the spring clip and the dimensions of the spring element used are advantageously coordinated with one another. Depending on the application, the spring clip may be made of a metallic material or a plastic, for example.

In principle, the use of a plurality of spring clips is also possible, the number used depending in particular on the size of the spring element and the forces acting during operation of the camshaft adjuster.

As described at the outset, the camshaft adjuster includes a stator and a rotor which is mounted in the stator. The dimensioning of the components depends on the size of the camshaft to be activated. The pressure chambers inside the stator may be acted on by hydraulic fluid for controlling the rotor. The torsion angle of the rotor depends in particular on the size of the pressure chamber as well as the width of the blades, or the relationship of these two variables with respect to one another.

The webs of the stator may be designed with blade stop surfaces against which the rotor blades may strike. There is the option of designing one or also multiple web(s) of the stator with blade stop surfaces. The other webs of the stator whose walls are not designed as blade stop surfaces are used in particular for delimiting the pressure chambers.

A sealing cover which laterally delimits the pressure chambers, i.e., the interior of the camshaft adjuster, is usually connected to the stator. The sealing cover may be designed, for example, as a locking cover in which a link for rotationally fixed locking of the rotor is introduced. The link is advantageously provided inside one of the pressure chambers in the form of a recess in which a piston may engage for locking. The position for locking is achieved by the spring element used, which is designed in such a way that it turns the rotor relative to the stator, and thus brings the rotor into the desired position. Alternatively, an embodiment is also conceivable in which the interior of the camshaft adjuster is laterally delimited on each side by a sealing cover.

Accordingly, the spring element, depending on the design of the camshaft adjuster and the selection of the cover used, is held via the spring clip either on a sealing cover or on a locking cover.

In addition, it is also possible in principle for the spring element to be held on a sealing cover which is part of a stator-cover unit. A stator-cover unit, i.e., a so-called stator cup, is preferably manufactured in one piece, for example with the aid of a sintering process. In this type of embodiment, for example, the manufacturing process for the camshaft adjuster may be shortened and the costs reduced.

In one advantageous embodiment of the present invention, the spring clip is radially oriented on the sealing cover, and has axially extending legs for the fastening. For this purpose, the spring clip advantageously has a base body on which the legs are situated. The base body fixes the axial spatial extension of the spring element, while the legs, which are used for fastening to the sealing cover, additionally delimit the extension of the spring element in the radial direction. Accordingly, as a result of the design of the spring clip, the freedom of movement of the spring element in the required boundaries may be set. The number of legs as well as the size of the base body of the spring element are selectable as a function of the dimensions of the camshaft adjuster.

In another advantageous embodiment of the present invention, the sealing cover is designed with a number of recesses for fastening the spring clip. The fastening may be carried out, for example, via a force fit or a form-locked fit between the sealing cover and the spring clip. The, or each, recess introduced into the sealing cover may have different shapes. For example, a recess may be designed in the form of a uniformly continuous borehole, for example as a so-called oblong hole. In such a design, the leg(s) of the spring clip may be jointly fastened in the recess.

Alternatively or additionally, multiple recesses may be introduced into the sealing cover, each being available for accommodating the spring clip. In particular, an offset undercut borehole is conceivable. A form-locked connection between the spring clip and the sealing cover may be achieved by an undercut.

The, or each, recess is also introduced in particular in the sealing cover, outside the area of the pressure chambers, so that external leakage of the camshaft adjuster, i.e., exit of hydraulic fluid from the pressure chambers, is prevented.

The legs of the spring clip are preferably locked in the recesses in the sealing cover. Secure and reliable component connections may be established with little installation effort by use of detent connections. For this purpose, the legs of the spring clip are preferably provided on their end-face sides with detent elements, such as locking catches, which may lock in the, or each, recess in the sealing cover. To this end, the recesses are in particular designed with a beveled edge which allows locking after the legs are inserted into the recesses. In the installed state, the beveled edge is used as an axial contact surface for the correspondingly designed legs of the spring clip.

In another advantageous embodiment, the legs of the spring clip are braced in the, or each, recess in the sealing cover. For installation, the legs of the spring clip may be pressed together, and may be pretensioned in this way. The distance between the leg ends then corresponds essentially to the distance between the recesses provided for fastening, or, in the case of a single recess in the form of an oblong hole, the distance between the sides bordering the oblong hole. After the spring clip is inserted into the, or each, recess, the legs of the spring clip may relax according to the acting restoring force, and are thus braced in the, or each, recess.

In principle, locking as well as bracing allow subsequent loosening of the connection between the spring clip and sealing cover, for example for repairs or necessary replacement of a component.

As an alternative to the above-mentioned options, in principle all connections are possible which ensure a secure fastening of the spring element to the sealing cover and the required axial installation space delimitation of the spring element. For example, a press fit is also conceivable, the cross section of the legs being slightly larger than the diameter of the recesses provided for fastening. The legs may be pressed into the recesses by applying pressure, and thus reliably connected to the sealing cover.

The spring element is particularly preferably designed as a coil spring whose windings are at least partially enclosed by the spring clip. Coil springs are frequently used, since they are able to withstand a large number of load cycles having a high pre-torque. The size of the coil spring, i.e., the number of its windings, is coordinated in particular with the available surface area on the sealing cover of the camshaft adjuster. The number of enclosed windings may be different, depending on the size of the spring clip and its positioning on the sealing cover. Due to the enclosure by the spring clip, the coil spring is fixed in the axial direction as well as radially on the sealing cover.

Of course, the springs used here are not limited to coil springs. Other springs which allow the rotor to rotate inside the stator may also be used in principle.

It is advantageous for the spring element to be additionally radially held on the sealing cover with the aid of a spring retainer. For this purpose, the outer spring end of the spring element is preferably fastened to the sealing cover with the aid of a pin. The winding of the spring element which runs out in this spring end is guided via a further pin, and is thus additionally secured in the radial direction via the spring retainer.

BRIEF DESCRIPTION OF THE DRAWINGS

Exemplary embodiments of the present invention are explained in greater detail below with reference to a drawing.

DETAILED DESCRIPTION

Figure 1:
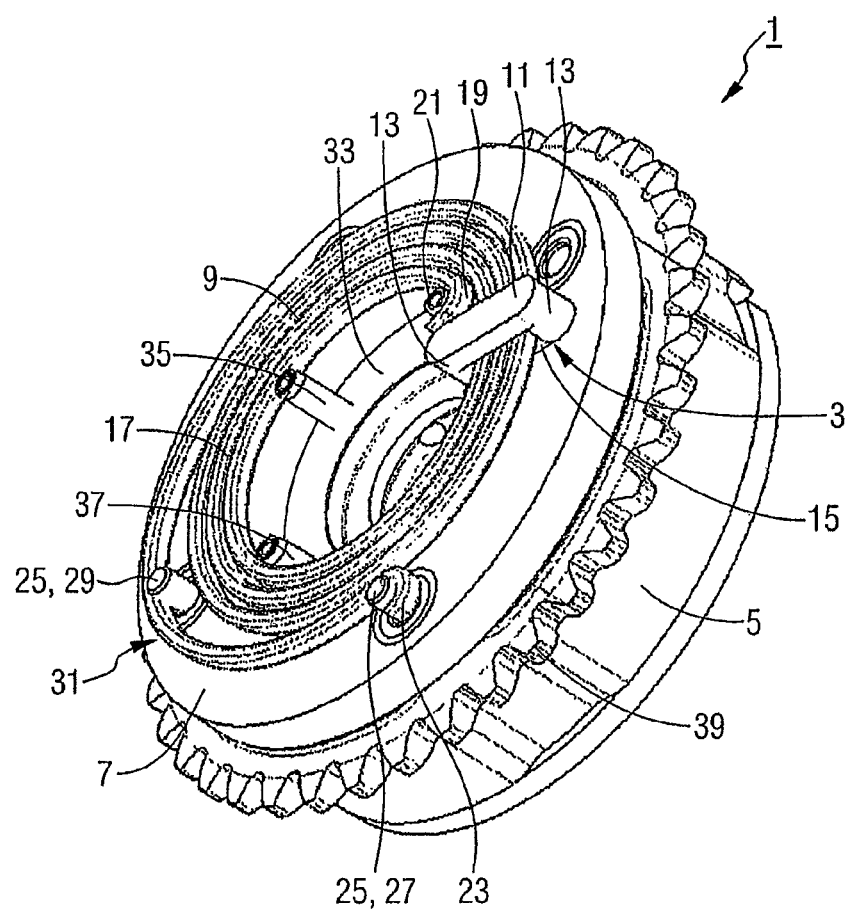
FIG. 1 shows a camshaft adjuster having a spring clip, in a three-dimensional illustration.

FIG. 1 shows a three-dimensional illustration of a camshaft adjuster 1 for an internal combustion engine, having a spring clip 3. Camshaft adjuster 1 includes a stator 5 which is connectable in a rotationally fixed manner to a crankshaft, and a rotor which is mounted in the stator 5 so as to be rotatable about a rotational axis. Due to the illustration in the assembled state, the rotor is not visible. The rotor supported inside the stator 5 is sealed against leaks by a sealing cover 7.

A spring element 9 designed as a coil spring is held on the sealing cover 7 in the axial direction via spring clip 3. Spring clip 3 is radially oriented on sealing cover 7, and encloses coil spring 9. For this purpose, spring clip 3 is designed with a base body 11 on which two axially extending legs 13 are situated. Base body 11 establishes the axial spatial extension of coil spring 9, while legs 13 additionally delimit the extension of the coil spring in the radial direction via the fastening to sealing cover 7.

For accommodating legs 13, sealing cover 7 has a recess 15 designed as an oblong hole. Recess 15 is introduced outside the area of the pressure chambers of stator 5, thus preventing external leakage. Legs 13 of spring clip 3 are braced in recess 15 in sealing cover 7 via recess 15. Legs 13 of spring clip 3 are appropriately pretensioned prior to installation, and are then connected to sealing cover 7 in a force-fit manner.

During installation, legs 13 are pressed together so that the distance between their leg ends essentially corresponds to the distance between the sides delimiting recess 15. After the legs 13 are inserted into recess 15, the legs relax again and are braced in recess 15.

Coil spring 9 has a number of windings 17 which are enclosed by spring clip 3. To allow secure fastening of coil spring 9, on the one hand inner spring end 19 of the coil spring encloses a spring retainer 21 which is designed as an axially extending pin. Outer spring end 23 of the coil spring is engaged with a further spring retainer 25. This spring retainer 25 additionally holds coil spring 9 on sealing cover 7. Spring retainer 25 is composed of two pins 27, 29, first pin 27 being enclosed by outer spring end 23 of coil spring 9. Winding 31 which runs out in spring end 23 is guided externally, i.e., partially around second pin 29 on the outer periphery of sealing cover 7, and is thus secured in the radial direction.

In addition to spring retainer 25, two further pins 35, 37 are situated on inner periphery 33 of sealing cover 7 which likewise allow radial securing of coil spring 9.

In addition, externally toothed chain wheel 39 is visible, via which camshaft adjuster 1 in the installed state may be connected via a chain drive to the crankshaft of an internal combustion engine.

Figure 2:
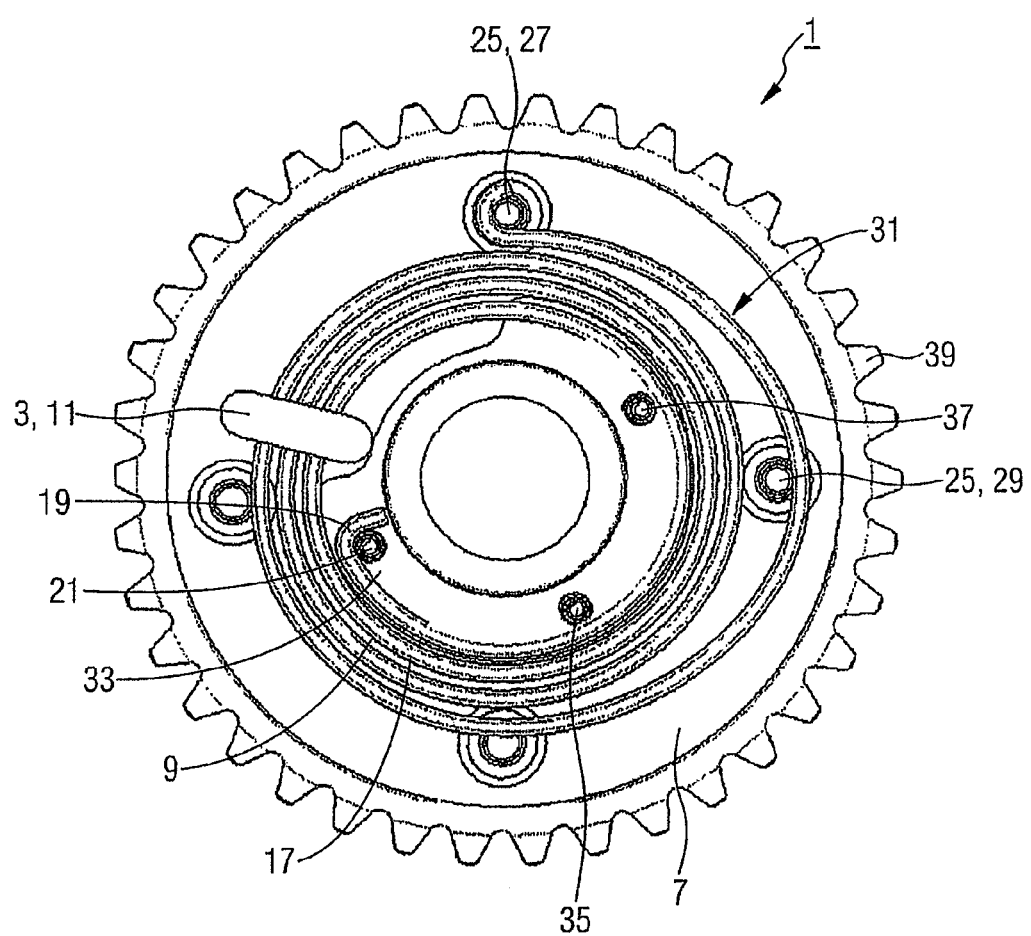
FIG. 2 shows the camshaft adjuster according to FIG. 1 in a top view.

FIG. 2 shows camshaft adjuster 1 according to FIG. 1 in a top view. Since the camshaft adjuster has already been described in detail in FIG. 1, at this point reference is made thereto.

Camshaft adjuster 1 has spring clip 3, which is used for fixing coil spring on sealing cover 7. It is apparent that spring clip 3 encloses windings 17 of coil spring 9. Base body 11 of spring clip 3 fixes the axial spatial extension of coil spring 9. Legs 13 also delimit the spatial extension of coil spring 9 in the radial direction. Accordingly, the freedom of movement may be set and in particular also limited via the dimensions of spring clip 3.

In addition, the fastening of coil spring 9 to camshaft adjuster 1 or to sealing cover 7 via respective spring ends 19, 23 of the coil spring is clearly apparent in FIG. 2. The two spring ends 19, 23 are held on sealing cover 7 via pins 21, 27, respectively.

Figure 3:
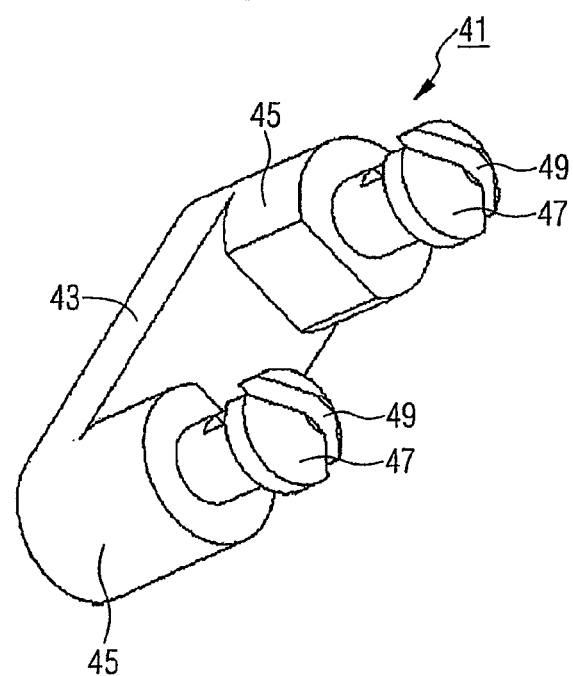
FIG. 3 shows a spring clip in a three-dimensional illustration.

FIG. 3 shows a three-dimensional illustration of a spring clip 41 for fixing a spring element on a sealing cover. Spring clip 41 is made of a metallic material. The spring clip has a base body 43 and two parallel legs 45 extending away from the base body. Legs 45 are designed with detent elements 47 at their respective ends.

Detent elements 47 are each designed with a gap 49 which allows detent elements 47 to be pressed together during the introduction into recesses of a sealing cover, with reduction of the gap dimensions. When legs 45 are positioned in the recesses, detent elements 47 resume their original shape and lock inside the recess. In the process, the dimensions of gaps 49 enlarge back to their original size. The fastening of spring clip 41 to the sealing cover via detent elements 47 is shown in the installed illustration in FIG. 4.

Figure 4:
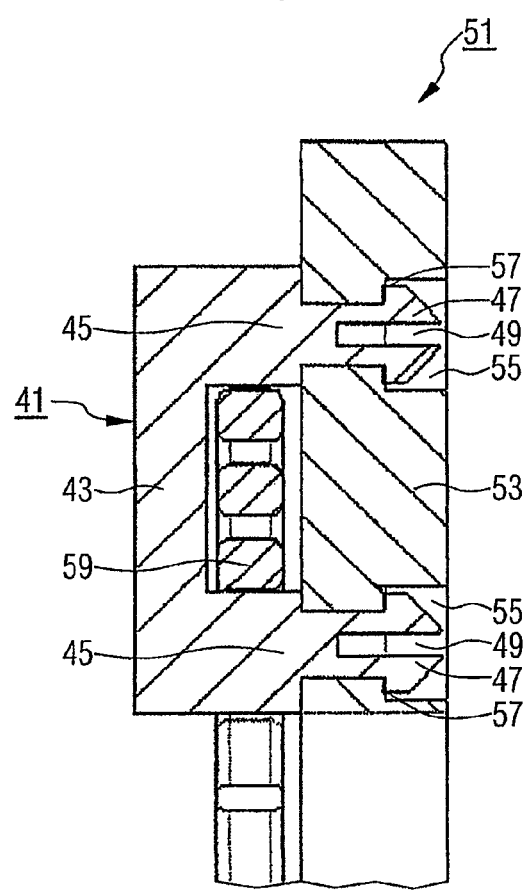
FIG. 4 shows a detail of another camshaft adjuster having a spring clip according to FIG. 3, in a longitudinal section.

FIG. 4 shows a detail of a camshaft adjuster 51 having a spring clip 41 according to FIG. 3, together with a sealing cover and spring clip 41 fastened thereto. The other components of camshaft adjuster 51 are not visible due to the only partial illustration.

In contrast to FIGS. 1 and 2, in the present case spring clip 41 is locked to sealing cover 53. Secure and reliable component connections may be established with little installation effort via detent connections. Detent elements 47 at the end-face sides of the legs, which in each case are locked in a recess 55 in sealing cover 53, are clearly apparent. Recesses 55 have an undercut design with a beveled edge 57. Beveled edge 57 is used as an axial contact surface for detent elements 47, and prevents undesirable loosening of the connection.

Spring element 59 designed as a coil spring is enclosed by spring clip 41, and is thus fixed on sealing cover 53 in the axial direction.

LIST OF REFERENCE NUMERALS 1 camshaft adjuster
3 spring clip
5 stator
7 sealing cover
9 spring element
11 base body
13 leg
15 recess
17 winding
19 inner spring end
21 spring retainer
23 outer spring end
25 spring retainer
27 pin
29 pin
31 winding
33 inner periphery
35 pin
37 pin
39 external toothing
41 spring clip
43 base body
45 leg
47 detent elements

49 gap
51 camshaft adjuster
53 sealing cover
55 recess
57 beveled edge
59 spring element

What is claimed is:

1. A camshaft adjuster for an internal combustion engine, comprising:
   a stator connectable in a rotationally fixed manner to a crankshaft;
   a rotor mounted in the stator so as to be rotatable about a rotational axis;
   a sealing cover nonrotably fixed to the stator; and
   a spring element for positioning the rotor with respect to the stator, the spring element being held in an axial direction on the sealing cover via a spring clip contacting a first surface of the spring element to hold the spring element axially against the sealing cover, the first surface facing axially away from the sealing cover.

2. The camshaft adjuster as recited in claim 1 wherein the spring clip is radially oriented on the sealing cover and has axially extending legs for the fastening.

3. The camshaft adjuster as recited in claim 2 wherein the legs of the spring clip are locked in at least one recess in the sealing cover.

4. The camshaft adjuster as recited in claim 2 wherein the legs of the spring clip are braced in at least one recess in the sealing cover.

5. The camshaft adjuster as recited in claim 1 wherein the sealing cover includes a plurality of recesses for fastening the spring clip.

6. The camshaft adjuster as recited in claim 1 wherein the spring element is designed as a coil spring with windings at least partially enclosed by the spring clip.

7. The camshaft adjuster as recited in claim 1 wherein the spring element is additionally radially held on the sealing cover with the aid of a spring retainer.

8. The camshaft adjuster as recited in claim 1 wherein the spring clip contacts an outer radial surface of the spring element and contacts an inner radial surface of the spring element so as to delimit extension of the spring element in a radial direction.

9. The camshaft adjuster as recited in claim 8 wherein the spring clip includes an axially extending first leg fixed to the sealing cover and contacting the outer radial surface of the spring element, the spring clip including an axially extending second leg fixed to the sealing cover and contacting the inner radial surface of the spring element.

10. The camshaft adjuster as recited in claim 9 wherein the spring clip includes a base body extending radially from the axially extending first leg to the second leg to fixedly join the axially extending first leg and the axially extending second leg, the base body contacting the first surface of the spring element to hold the spring element in the axial direction on the sealing cover.

11. The camshaft adjuster as recited in claim 9 wherein the axially extending first leg extends through a first recess in the cover to contact an axial surface of the sealing cover, the axially extending second leg extending through a second recess in the cover to contact the axial surface of the sealing cover, the axial surface of the sealing cover facing the rotor.

12. The camshaft adjuster as recited in claim 1 wherein the spring clip is nonrotably fixed to the sealing cover.

* * * * *